United States Patent [19]

Gonzalez

[11] Patent Number: 5,433,756
[45] Date of Patent: * Jul. 18, 1995

[54] CHEMICAL CLEAN COMBUSTION PROMOTER COMPOSITIONS FOR LIQUID FUELS USED IN COMPRESSION IGNITION ENGINES AND SPARK IGNITION ENGINES

[76] Inventor: Frank Gonzalez, 2916 W. T.T. Jester, Ste. 105, Houston, Tex. 77018

[*] Notice: The portion of the term of this patent subsequent to May 31, 2011 has been disclaimed.

[21] Appl. No.: 199,948

[22] Filed: Feb. 22, 1994

Related U.S. Application Data

[63] Continuation-in-part of Ser. No. 932,063, Aug. 19, 1992, Pat. No. 5,316,558, which is a continuation-in-part of Ser. No. 608,526, Nov. 2, 1990, Pat. No. 5,141,524.

[51] Int. Cl.$^6$ ............................................. C10L 1/22
[52] U.S. Cl. ................................. 44/340; 44/414; 44/439; 44/451
[58] Field of Search ................ 44/340, 414, 439, 438, 44/451

[56] References Cited

U.S. PATENT DOCUMENTS

| | | | |
|---|---|---|---|
| 3,002,827 | 10/1961 | Fenske | 44/451 |
| 3,163,504 | 12/1964 | Calvino | 44/340 |
| 4,131,434 | 12/1978 | Gonzalez | 44/413 |
| 4,682,984 | 7/1987 | Epher | 44/448 |
| 5,116,390 | 5/1992 | Rodriquez et al. | 44/302 |
| 5,141,524 | 8/1992 | Gonzalez | 44/340 |
| 5,316,558 | 5/1994 | Gonzalez | 44/340 |

*Primary Examiner*—Margaret Medley
*Attorney, Agent, or Firm*—Kenneth A. Roddy

[57] ABSTRACT

Catalytic clean-combustion-promoter compositions for use with finished gasoline or diesel fuels in compression ignition engines and spark ignition engines improve fuel efficiency and reduce air polluting emissions. The compositions utilize ketones as solvents, alcohols as cosolvents, nitroparaffin compounds as combustion supporters, and, to promote the chemical reactions, a catalytic medium is used. When the additive compositions are employed in microvolumetric concentrations ranging from 670 to 1,350 parts per million by volume of engine fuel, the chemical bonding of the carbon molecules with the oxygen molecules is increased during the combustion process, thus, producing a synergistic effect, which increases the combustion characteristic of the fuels to be burned and reduces the tendency of the fuel to create deposits, and therefore reduces the $CO_2$ and $NO_X$ emissions, and increases the fuel economy. Engines operating with the present compositions added to the fuel do not require the use of fuels with a high cetane or octane number for maximum performance. The present chemical clean-combustion-promoter compounds meet the standards of the EPA "Clean Air Act" as amended in 1990 for emissions from liquid hydrocarbon fuels.

4 Claims, No Drawings

CHEMICAL CLEAN COMBUSTION PROMOTER COMPOSITIONS FOR LIQUID FUELS USED IN COMPRESSION IGNITION ENGINES AND SPARK IGNITION ENGINES

CROSS REFERENCE TO RELATED APPLICATION

This application is a Continuation-In-Part of U.S. Patent Application Ser. No. 07/932,063 filed Aug. 19, 1992 now U.S. Pat. No. 5,316,558 granted May 31, 1994 which is a Continuation-In-Part Of U.S. Patent Application Ser. No. 07/608,526, filed Nov. 2, 1990, now U.S. Pat. No. 5,141,524 granted Aug. 25, 1992.

BACKGROUND OF THE INVENTION

1. FIELD OF THE INVENTION

This invention relates generally to additives for gasoline and diesel fuels, and more particularly to a catalytic clean-combustion-promoter composition to improve fuel efficiency and reduce air polluting effects of liquid hydrocarbon fuels.

2. BRIEF DESCRIPTION OF THE PRIOR ART

The Environmental Protection Agency (EPA) "Clean Air Act" sets the standards for nitrogen oxide ($NO_x$) and particulate matter emissions from fuels. The Clean Air Act was amended in the Fall of 1990 to limit pollution from 189 toxic substances. Focusing on toxicity and exposure potential, the EPA has designated the following chemicals as toxic enemies No. 1 through 17: benzene; cadmium and its compounds; cyanides; dichloromethane; lead and its compounds; mercury and its compounds; methyl ethyl ketone; nickel and its compounds; tetrachloroethylene; toluene; 1,1,1-trichloroethane; trichloroethane; and xylene(s).

Carbon dioxide ($CO_2$) emission contribute to the "greenhouse effect". Nitrogen oxide ($NO_x$) emissions are related to high combustion temperatures associated with higher oxygen levels, and contribute to the production of "photochemical smog". It is known that particulate matter emissions can be decreased by reducing the sulfur content of fuels. Gasoline and diesel fuel additives are also known, which, when added to the basic engine fuel, will improve fuel efficiency and reduce air polluting effects of the fuel. There are several patents on such additives. However, many of these compositions contain chemicals identified by the EPA as posing the greatest threats to human health and making them unsuitable or illegal to use.

Fenske, U.S. Pat. No. 3,002,827, discloses a fuel composition for diesel engines, where he uses an aliphatic nitro-compound selected from the class consisting of nitro-alkanes, alkyl nitrates, alkyl nitrites, and nitro alcohol nitrates as an ignition promoter and in the ratio of from about 0.5% to 1.5% in volume (5,000 to 15,000 parts per million).

Calvino, U.S. Pat. No. 3,163,504, teaches the use of alkyl pyrrolidone as an inhibitor of aqueous haze formation in the ratio of from about 1.0% to 2.0% in volume (10,000 to 20,000 parts per million).

Michaels, U.S. Pat. No. 2,900,297, discloses a fuel composition which uses nitroparaffin compounds blended with gasoline and a liquid ester lubricant. The present invention, on the other hand, utilizes nitroparaffin compounds only as combustion supporters for gasoline and diesel fuels.

Eckerd, U.S. Pat. No. 3,707,360, discloses the use of nitropropane combined with calcium compounds to reduce smoke emissions. The calcium sulfonate used by Eckerd creates deposits which cause plugging of the fuel injectors in a combustion engine, and results in reduced engine efficiency and increased emission of air pollutants.

Simmons, U.S. Pat. No. 4,073,626, discloses a diesel fuel additive which uses an iron salt of an aromatic nitro acid as ferrous picrate, and a nitro aliphatic compound as 1-nitropropane blended with an aromatic petroleum solvent as xylene, toluene, etc., to increase the fuel's combustion. The xylene and toluene compounds utilized by Simmons are now forbidden by the EPA "Clean Air Act" as amended in 1990. The present invention, on the other hand, utilizes nitroparaffin compounds as combustion supporters for gasoline and diesel fuels and contains none of the toxic chemicals referred to in the 1990 "Clean Air Act" amendment.

Gonzalez, U.S. Pat. No. 4,131,434, discloses a catalytic additive composition for combustion engine fuels which includes benzene, toluene, or xylene, and methyl ethyl ketone. These compounds are now forbidden by the EPA "Clean Air Act" as amended in 1990. The present invention, on the other hand, contains none of the toxic chemicals referred to in the 1990 "Clean Air Act" amendment.

The present invention is distinguished over the prior art in general, and these patents in particular by a chemical clean-combustion-promoter composition for use with finished gasoline and diesel fuels in compression ignition engines and spark ignition engines to improve fuel efficiency and reduce air polluting emissions. The chemical clean-combustion-promoter compositions utilize ketones as solvents, alcohols as cosolvents, nitroparaffin compounds as combustion supporters, and, to promote the chemical reactions, a catalytic medium is used. When all the compounds are combined in the recited quantities, the chemical bonding of the carbon molecules with the oxygen molecules is increased during the combustion process, thus, producing a synergistic effect, which increases the combustion characteristic of the fuels to be burned and reduces the tendency of the fuel to create deposits, and therefore reduces the $CO_2$ and $NO_x$ emissions, and increases the fuel economy. Engines operating with the chemical clean-combustion-promoter compositions added to the fuel do not require the use of fuels with a high cetane or octane number for maximum performance. The additives are employed in microvolumetric concentrations ranging from 670 to 1,350 parts per million by volume of engine fuel. The present chemical clean-combustion-promoter compounds meet the standards of the EPA "Clean Air Act" as amended in 1990 for emissions from liquid hydrocarbon fuels.

SUMMARY OF THE INVENTION

It is therefore an object of the present invention provide a catalytic clean-combustion-promoter composition which, when added to finished liquid hydrocarbon fuels, will improve the combustion characteristics of the fuel during the combustion process.

It is another object of this invention to provide a catalytic clean-combustion-promoter composition which is effective when added in concentrations of parts per million (ppm) by volume of fuel.

Another object of this invention is to provide a catalytic clean-combustion-promoter composition which, when added to liquid hydrocarbon fuels in micro-amounts, will increase the vaporization of fuel droplets during the atomization process in fuel injectors and allow more efficient burning of the carbons in the fuels to reduce exhaust emissions of carbon dioxide ($CO_2$) and increase the fuel economy.

Another object of this invention is to provide a catalytic clean-combustion-promoter composition which, when added to liquid hydrocarbon fuels in micro-amounts, will depolymerize existing gum formation and hold oxidation constituents in solution.

Another object of this invention is to provide a catalytic clean-combustion-promoter composition which, when added to gasoline fuels in micro-amounts, will reduce its vapor pressure (RVP) which decreases the abnormal volatility of the gasoline fuel.

A further object of this invention is to provide a catalytic clean-combustion-promoter composition which, when added to liquid hydrocarbon fuels in micro-amounts, will clean the whole fuel system of gums and varnishes, remove the particles of carbon built-up on injectors, valves, and on the combustion engine parts, thus promoting the normal combustion chamber temperatures and allowing a quicker cooling effect which also contributes to reduced exhaust emissions of nitrogen oxides ($NO_X$).

A still further object of this invention is to provide a catalytic clean-combustion-promoter composition which utilizes ketones and alcohols with slow evaporation rates, to reduce the volatile tendency of the fuel composition as required by the EPA's "Clean Air Act" amendment of 1990 and does not use toxic chemicals forbidden by the "Clean Air Act" such as; benzene, toluene, xylene(s), methyl ethyl ketone (MEK) and methyl isobutyl ketone (MIBK).

Other objects of the invention will become apparent from time to time throughout the specification and claims as hereinafter related.

The above noted objects and other objects of the invention are accomplished by a catalytic clean-combustion-promoter composition for use with finished gasoline and diesel fuels in compression ignition engines and spark ignition engines to improve fuel efficiency and reduce air polluting emissions. The catalytic clean-combustion-promoter compositions utilize ketones as solvents, alcohols as cosolvents, nitroparaffin compounds as combustion supporters, and, to promote the chemical reactions, a catalytic medium is used. When all the compounds are combined in the recited quantities, the chemical bonding of the carbon molecules with the oxygen molecules is increased during the combustion process, thus, producing a synergistic effect, which increases the combustion characteristic of the fuels to be burned and reduces the tendency of the fuel to create deposits, and therefore reduces the $CO_2$ and $NO_X$ emissions, and increases the fuel economy. Engines operating with the catalytic clean-combustion-promoter compositions added to the fuel do not require the use of fuels with a high cetane or octane number for maximum performance. The additives are employed in microvolumetric concentrations ranging from 670 to 1,350 parts per million by volume of engine fuel. The present catalytic clean-combustion-promoter compounds meet the standards of the EPA "Clean Air Act" as amended in 1990 for emissions from liquid hydrocarbon fuels.

DESCRIPTION OF THE PREFERRED EMBODIMENT

The present invention is a catalytic clean-combustion-promoter composition which is used with finished gasoline and diesel fuels in compression ignition engines and spark ignition engines to improve fuel economy and reduce air polluting emissions. Engines operating with the catalytic clean-combustion-promoter compositions added to the fuel do not require the use of fuels with a high cetane or octane number for maximum performance.

The catalytic clean-combustion-promoter compositions utilize ketones as solvents, alcohols as cosolvents, ethers as octane supporters in unleaded gasoline fuels, nitroparaffin compounds as combustion supporters in diesel fuels, and, to promote the catalytic reactions a catalytic medium is used. The compounds of the catalytic clean-combustion-promoter compositions are provided in micro volumetric concentrations between 670 to 1,350 parts per million (ppm) by volume of the basic liquid engine fuel, regardless whether the chemical components are in the lower or upper percentage range by volume ratio.

When all the compounds are combined in the quantities as described below, the molecular structure and surface tension of the fuel is transformed through chemical bonding to produce a synergistic effect, which increases the combustion characteristic of the fuels to be burned and reduces the tendency of the fuel to create deposits, and therefore reduces the exhaust emissions.

It should pointed out that the present catalytic clean-combustion-promoter composition meets the standards of the EPA "Clean Air Act" as amended in the Fall of 1990 by utilizing ketones and alcohols with slow evaporation rates to reduce the volatile tendency of the fuel composition as required by the Act and does not use toxic chemicals forbidden by the Act, such as; benzene, toluene, xylene(s), methyl ethyl ketone (MEK) and methyl isobutyl ketone (MIBK).

The present catalytic clean-combustion-promoter composition utilizes the catalytic additives in ratio by volume of fuel as follows:

1) From 1 to 55% for unleaded gasolines, or from 1 to 85% for diesel fuels, of ketone as a solvent selected from the group consisting of 2-heptanone $C_7H_{14}O$, 5-methyl-3-heptanone $C_8H_{16}O$, and 4-methyl-3-penten-2-one $C_6H_{16}O$;

2) From 1 to 60% for unleaded gasolines, or from 1 to 85% for diesel fuels, of an alcohol as a cosolvent selected from the group consisting of 2-pentanol-4-methyl-4-hydroxy $C_6H_{12}O_2$, and 2-pentanol-4-methyl $C_6H_{14}O$;

3) From 1 to 30% for unleaded gasolines, or from 1 to 45% for diesel fuels, of a catalytic medium to promote chemical reactions, 1-methyl, 2-pyrrolidone $C_5H_9NO$; and 4) From 1 to 35% for unleaded gasolines, or from 1 to 85% for diesel fuels, of a nitro-compound selected from the group consisting of 1-nitropropane $CH_3CH_2CH_2NO_2$, 2-nitropropane $CH_3CH(NO_2)CH_3$, and nitroethane $CH_3CH_2NO_2$ used as combustion supporters in gasoline or diesel fuels.

In the following Table "A", the compounds are identified by specific ratio mixtures for the respective unleaded gasoline and diesel fuels when mixed in microvolumetric concentrations ranging from 670 to 1,350 parts per million (ppm) additive by volume of fuel, regardless whether the catalytic components are in the lower or upper percentage range by volume ratio.

TABLE A

| COMPOUNDS | CATALYTIC PROMOTER "G" For unleaded gasoline. Mixture ratio from 670 ppm to 1,350 ppm by volume | CATALYTIC PROMOTER "D" For diesel fuel. Mixture ratio from 670 ppm to 1,350 ppm additive by volume of fuel |
|---|---|---|
| ALIPHATIC KETONE SOLVENTS 2-heptanone $C_7H_{14}O$, 5-methyl-3-heptanone $C_8H_{16}O$, and 4-methyl-3-penten-2-one $C_6H_{10}O$ | From 1% to 55% | From 1% to 85% |
| ALCOHOL AS COSOLVENT 2-pentanol-4-methyl-4-hydroxy $C_6H_{12}O_2$, and 2-pentanol-4-methyl $C_6H_{14}O$ | From 1% to 60% | From 1% to 85% |
| CATALYTIC MEDIUM 1-methyl, 2-pyrrolidone $C_5H_9NO$ | From 1% to 30% | From 1% to 45% |
| NITROPARAFFINS AS COMBUSTION SUPPORTERS 1-nitropropane $CH_3CH_2CH_2NO_2$, 2-nitropropane $CH_3CH(NO_2)CH_3$, and nitroethane $CH_3CH_2NO_2$ | From 1% to 35% | From 1% to 85% |

The addition of these catalytic clean-combustion-promoter compositions to liquid fuels in microvolumetric concentration by volume of the basic fuel enhance the attraction between carbon (C) molecules of gasified fuel with the oxygen ($O_2$) molecules from the air during the combustion process. This effect increases the amount of oxidized fuel, thus, reducing the carbon dioxide ($CO_2$) emissions.

The addition of these catalytic clean-combustion-promoter compositions to liquid fuels increases the radiation of the flame during the combustion process which reduces the time of vaporization of the fuel droplets. This effect increases the amount of molecules of gasified fuel which can be oxidized, thus, increasing the fuel economy, and reducing the carbon dioxide ($CO_2$) emissions.

The catalytic clean-combustion-promoter composition will increase the speed of vaporizarion of fuel droplets during the atomization process, thus, allowing more efficient burning of the hydrocarbons in the fuels to reduce exhaust emissions of nitrogen oxide ($NO_X$), carbon dioxide ($CO_2$), and visible smoke.

During combustion, as the outer edge of the flame absorbs the radiation, the outer surface of the flame is heated to moderate temperatures, producing a cooling effect into the cylinders which reduces the temperatures of the gases of combustion, thus, reducing the nitrogen oxide ($NO_X$) emissions.

Moreover, these catalytic clean-combustion-promoter compositions increase the lubricity or "oiliness" of gasolines and diesel fuels, thus, reducing friction between moving parts. The present catalytic clean-combustion-promoter composition also depolymerizes existing gum formations and holds oxidation constituents in solution such that the whole fuel system will be cleaned of gums and varnishes, and particles of carbon built-up on fuel pumps, injectors, valves, and on other combustion chamber parts will be removed, thus, reducing the necessity of using engine fuels with a high cetane or octane number. The cleaning effects promote normal combustion chamber temperatures and allow quicker cooling which also contributes to reduced exhaust emissions of nitrogen oxides ($NO_X$), The catalytic clean-combustion-promoter compositions are subject to total combustion at the same temperature as the fuels and the particular formulation of the chemical compounds, when added to finished liquid hydrocarbon fuels, produce a synergistic effect which promotes a cleaner combustion of finished liquid hydrocarbon fuels, thus, improving the fuel economy and reducing the carbon dioxide ($CO_2$) and nitrogen oxide ($NO_X$) emmissions.

When added to gasoline fuels, the catalytic clean-combustion-promoter composition reduces the vapor pressure (RVP) which decreases the abnormal volatility of the gasoline fuel.

The present catalytic clean-combustion-promoter composition meets the standards of the EPA "Clean Air Act" as amended in the Fall of 1990 by utilizing ketones and alcohols with slow evaporation rates to reduce the volatile tendency of the fuel composition as required by the Act and does not use toxic chemicals forbidden by the Act, such as; benzene, toluene, xylene(s), methyl ethyl ketone (MEK) and methyl isobutyl ketone (MIBK).

PROOF OF EFFICACY OF THE CLEAN COMBUSTION PROMOTER COMPOSITIONS

The "Protection of the Environment Federal Test Procedure", as given in full detain in the Code of Federal Regulations (CFR) Vol. 40, Chapter I, of the Environmental Protection Agency (EPA), Parts 86 to 99, was used to measure the pollutant emissions from liquid hydrocarbon fuels. The condition of test fuels are described in Subpart N-Emissions Regulations for New Otto-Cycle and Diesel Heavy-Duty Engines. The "Federal Test Procedure (FTP) CVS-1975 Cycle" was used for testing gasolines. The fuel economy was determined by using a form of carbon balance from the engine's exhaust emissions.

The efficacy of the catalytic clean-combustion-promoter composition for gasolines was evaluated in a fleet of six (6) vehicles without catalytic converters during 3,000 km at the Exhaust Emissions Laboratory of the Instituto Mexicano del Petroleo (Mexican Petroleum Institute, "IMP") in Mexico City. The fuels were leaded gasoline and unleaded gasoline produced by PEMEX.

The unleaded gasoline was tested in the following vehicles:

(A) VOLKSWAGON JETTA Model 1989 with 37,387 km;
(B) FORD TOPAZ Model 1989 with 52,906 km; and
(C) NISSAN PICKUP Model 1988 with 228,000 km.

The leaded gasoline was tested in the following vehicles:

(D) DODGE PICKUP Model 1989 with 59,740 km;
(E) VOLKSWAGON SEDAN Model 1988 with 49,925 km; and
(F) FORD PICKUP Model 1989 with 59,753 km.

EMISSIONS AND FUEL ECONOMY EVALUATION EPA's FTP-CVS-9175 CYCLE

Fleet Vehicles (A), (B), and (C)

The unleaded gasoline was treated in a ratio of one (1) volume of additive to two-thousand (2,000) volumes of fuel. Equivalent to 500 ppm.

| | Total Average After 3,000 km | |
|---|---|---|
| Pollutant | Untreated Gasoline g/km | Treated Gasoline g/km |
| HC | Base | −7.6% |
| NO$_X$ | Base | −9.5% |
| CO | Base | −9.5% |
| Fuel Economy km/Lt | Base | +2.5% |

Fleet Vehicles (D), (E), and (F)

The leaded gasoline was treated in a ratio of one (1) volume of additive to fifteen-hundred (1,500) volumes of fuel. Equivalent to 666 ppm.

| | Total Average After 3,000 km | |
|---|---|---|
| Pollutant | Untreated Gasoline g/km | Treated Gasoline g/km |
| HC | Base | −12.7% |
| NO$_X$ | Base | −12.5% |
| CO | Base | −13.3% |
| Fuel Economy km/Lt | Base | +5.1% |

The efficacy of the catalytic clean-combustion-promoter composition for diesel fuel was evaluated in a Mack engine Model E7-350 by the MAE Department of the West Virginia University using the EPA "Federal Test Procedure (FTP) Transient Cycle". The base line fuel used was low sulfur diesel fuel (0.05% weight) produced by PEMEX. The treated diesel fuel used the catalytic clean-combustion-promoter composition in a ratio of one (1) volume of additive to seven-hundred fifty (750) volumes of fuel. Equivalent to 1,333 ppm. The fuel economy was determined by using a form of carbon balance from the engine's exhaust emissions. The EPA's FTP-Transient Cycle was repeated at least four (4) times to ensure test validity.

While this invention has been described fully and completely with special emphasis upon a preferred embodiment, it should be understood that within the scope of the appended claims the invention may be practiced otherwise than as specifically described herein.

I claim:

1. A liquid petroleum derived diesel fuel composition comprising a basic diesel fuel for compression ignition engines and a catalytic clean-combustion-promoter composition comprising by volume:

| | |
|---|---|
| a ketone solvent selected from the group consisting of mesityl oxide, ethyl isoamyl ketone, and n-amyl ketone | from 1 to 85%, |
| a cosolvent selected from the group consisting of diacetone alcohol, methyl amyl alcohol, and methyl isobutyl carbinol | from 1 to 85%, |
| a catalytic medium comprising 1-methyl-2-pyrrolidone and | from 1 to 45%, |
| a nitroparaffin compound selected from the group consisting of 1-nitropropane, 2-nitropropane, and nitroethane | from 1 to 85%, | said catalytic clean combustion promoter composition is present in micro volumetric concentrations between 670 to 1,350 parts per million (ppm) relative to the volume of the basic diesel fuel, regardless whether the components are in the lower or upper percentage range by volume ratio.

2. A liquid petroleum derived gasoline fuel composition comprising a basic leaded or unleaded gasoline fuel for spark ignition engines and a catalytic clean combustion promoter composition comprising by volume:

| | |
|---|---|
| a ketone solvent selected from the group consisting of mesityl oxide, ethyl isoamyl ketone, and n-amyl ketone | from 1 to 55%, |
| a cosolvent selected from the group consisting of diacetone alcohol, methyl amyl alcohol, and methyl isobutyl carbinol | from 1 to 60%, |
| a catalytic medium comprising 1-methyl-2-pyrrolidone and | from 1 to 30%, |
| a nitroparaffin compound selected from the group consisting of 1-nitropopane, 2-nitropropane, and nitroethane | from 1 to 35%, | said catalytic clean combustion promoter composition is present in micro volumetric concentrations between 670 to 1,350 parts per million (ppm) relative to the volume of the basic leaded or unleaded

EMISSIONS AND FUEL ECONOMY EVALUATION EPA's FTP-TRANSIENT CYCLE Mack Engine Model E7-350

| DATE | TEST # | HC g/Bhp-hr | CO g/Bhp-hr | CO$_2$ g/Bhp-hr | NO$_X$ g/Bhp-hr | PARTICULATES g/Bhp-hr | FUEL ECONOMY (MPG) |
|---|---|---|---|---|---|---|---|
| BASE LINE LOW SULFUR DIESEL FUEL (0.05% weight) | | | | | | | |
| 9/28/93 | T-3 | 0.0811 | 0.7488 | 568.316 | 3.8682 | 0.122 | 5.36 |
| 9/28/93 | T-4 | 0.0464 | 0.7735 | 573.2452 | 4.5142 | 0.117 | 5.44 |
| 9/28/93 | T-5 | 0.0500 | 0.8839 | 575.3219 | 4.4404 | 0.117 | 5.44 |
| 9/29/93 | T-2 | 0.0496 | 0.7708 | 574.7241 | 3.9310 | 0.106 | 5.35 |
| 9/29/93 | T-3 | 0.0607 | 0.7295 | 586.5780 | 3.9889 | 0.105 | 5.36 |
| AVERAGE | | 0.0576 | 0.7813 | 575.6370 | 4.1485 | 0.113 | 5.39 |
| LOW SULFUR DIESEL FUEL (0.05% weight) TREATED WITH CATALYTIC CLEAN-COMBUSTION-PROMOTER FOR DIESEL (Mixture Ratio: 1 volume of additive to 750 volumes of fuel, or 1,333 PPM) | | | | | | | |
| 10/12/93 | T-2 | 0.0819 | 0.7177 | 508.4987 | 3.3861 | 0.1240 | 6.13 |
| 10/12/93 | T-3 | 0.0762 | 0.7804 | 510.8416 | 3.3845 | 0.1220 | 6.15 |
| 10/12/93 | T-4 | 0.0682 | 0.8270 | 503.9674 | 3.4018 | 0.1200 | 6.26 |
| 10/12/93 | T-5 | 0.0782 | 0.7338 | 511.3304 | 3.4686 | 0.1120 | 6.14 |
| AVERAGE | | 0.0761 | 0.7647 | 508.6595 | 3.4102 | 0.1195 | 6.17 | gasoline, regardless whether the components are in the lower or upper percentage range by volume ratio.

3. A liquid petroleum derived fuel catalytic clean-combustion-promoter composition for use as an additive to be added to finished diesel fuels in micro volumetric concentrations between 670 to 1,350 parts per million (ppm) relative to the volume of the basic finished diesel fuel, the composition comprising by volume:

| | |
|---|---|
| a ketone solvent selected from the group consisting of mesityl oxide, ethyl isoamyl ketone, and n-amyl ketone | from 1 to 85%, |
| a cosolvent selected from the group consisting of diacetone alcohol, methyl amyl alcohol, and methyl isobutyl carbinol | from 1 to 85%, |
| a catalytic medium comprising 1-methyl-2-pyrrolidone and | from 1 to 45%, |
| a nitroparaffin compound selected from the group consisting of 1-nitropropane, 2-nitropropane, and nitroethane. | from 1 to 85% |

4. A liquid petroleum derived fuel catalytic clean-combustion-promoter composition for use as an additive to be added to finished leaded and unleaded gasoline fuels in micro volumetric concentrations between 670 to 1,350 parts per million (ppm) relative to the volume of the basic finished leaded or unleaded gasoline fuel, the composition comprising by volume:

| | |
|---|---|
| a ketone solvent selected from the group consisting of mesityl oxide, ethyl isoamyl ketone, and n-amyl ketone | from 1 to 55%, |
| a cosolvent selected from the group consisting of diacetone alcohol, methyl amyl alcohol, and methyl isobutyl carbinol | from 1 to 60%, |
| a catalytic medium comprising 1-methyl-2-pyrrolidone and | from 1 to 30%, |
| a nitroparaffin compound selected from the group consisting of 1-nitropropane, 2-nitropropane, and nitroethane | from 1 to 35%. |

* * * * *